Feb. 28, 1967 D. J. LEONARD 3,306,984

ELIMINATION OF TALK-OFF IN IN-BAND SIGNALING SYSTEMS

Filed Dec. 16, 1963 2 Sheets-Sheet 1

INVENTOR
D. J. LEONARD
BY R. B. Ardis
ATTORNEY

Feb. 28, 1967 D. J. LEONARD 3,306,984

ELIMINATION OF TALK-OFF IN IN-BAND SIGNALING SYSTEMS

Filed Dec. 16, 1963 2 Sheets-Sheet 2

United States Patent Office 3,306,984
Patented Feb. 28, 1967

3,306,984
ELIMINATION OF TALK-OFF IN IN-BAND SIGNALING SYSTEMS

Donald J. Leonard, Hillsborough Township, Somerset County, N.J., assignor to Bell Telephone Laboratories, Incorporated, New York, N.Y., a corporation of New York Filed Dec. 16, 1963, Ser. No. 330,698
4 Claims. (Cl. 179—84)

Figure 1:
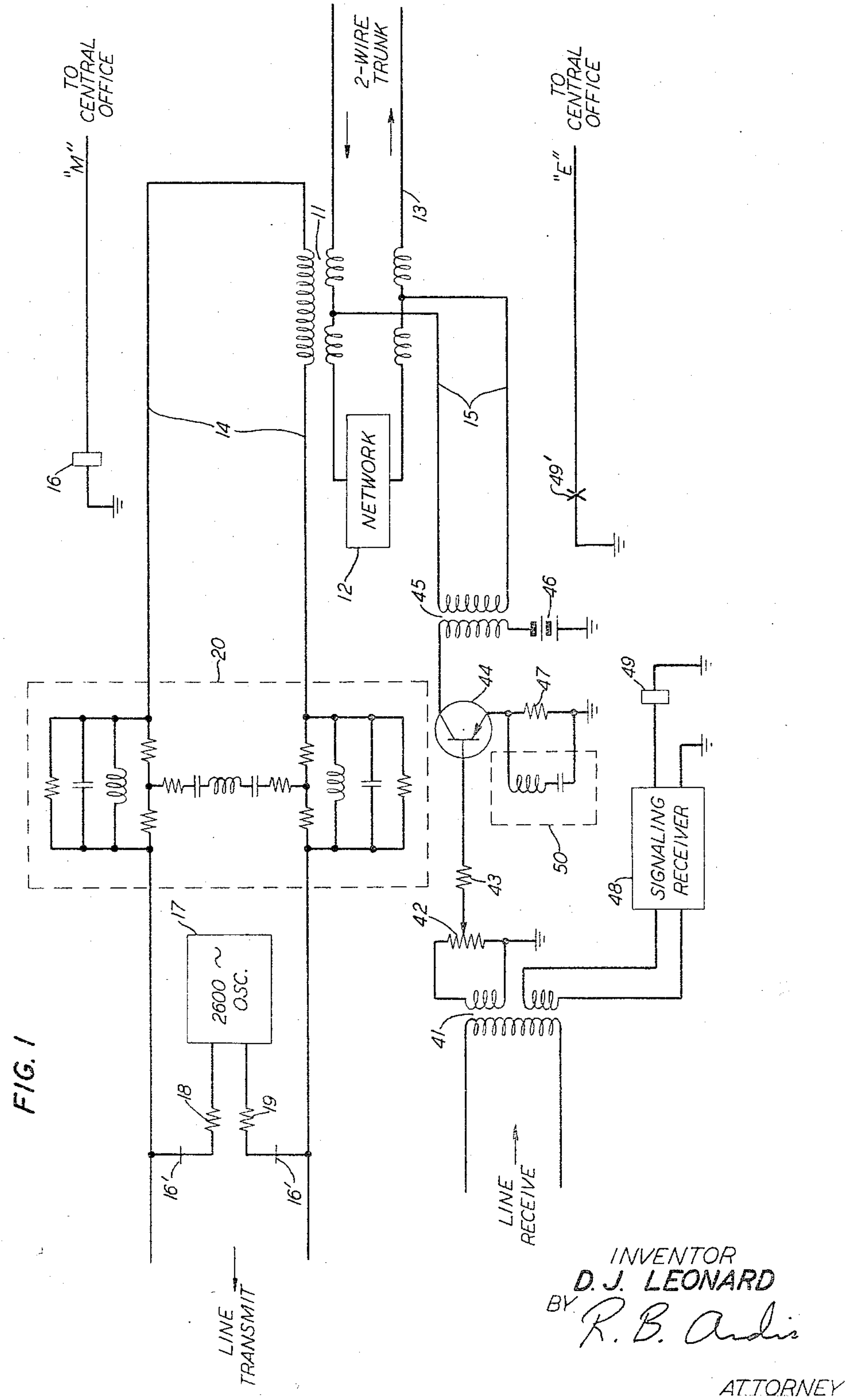

This invention relates generally to the transmission of telephone signaling information over interoffice trunks and, more particularly, to the transmission of such information by the use of single-frequency tones which are within the range of frequencies normally occupied by voice-frequency message waves.

Signaling, in telephone parlance, refers to the transmission of control information ancillary to the voice-frequency message waves which it is the primary purpose of a telephone system to transmit. In trunks interconnecting telephone central offices, typical signaling information includes that needed to establish and maintain each telephone connection as well as that needed to terminate each connection subsequent to its establishment. Because most present-day long distance telephone trunks use carrier transmission, the most common signaling arrangements make use of at least one substantially single-frequency in-band tone to transmit the necessary control information. Such signaling arrangements are fully compatible with the carrier trunks because the tones can be transmitted in exactly the same way as the voice-frequency message waves. The tones are referred to as in-band simply because the signals for a particular connection are sent in the same frequency band as the voice-frequency message rather than in some higher frequency band or as D.-C. signals.

In a typical in-band signaling system, a substantially single-frequency tone within the voice band is transmitted over the telephone trunk from one central office to another to indicate that the trunk is idle and is removed to indicate that the trunk is busy. To avoid false trunk-idle indications when the transmitted voice-frequency message waves contain significant energy at the signaling frequency, most in-band signaling systems make use of a so-called guard circuit at the receiving terminal to detect energy in the remainder of the voice-frequency band. In such systems, a trunk-idle indication is permitted only when the energy at the signaling frequency exceeds the energy in the remainder of the band for a predetermined length of time. Because speech usually contains more energy in the remainder of the voice-frequency band than it does at the signaling frequency, false trunk-idle indications are normally avoided.

Even with guard circuits employed, occasional abnormal conditions have caused in-band signaling systems to be troubled by false trunk-idle indications. Such false indications, which are likely to cause a connection to be released prematurely, can occur when external noises at the signaling frequency are generated on the telephone subscriber's premises. There have, for example, been complaints that birds in the vicinity of the telephone instrument or nearby bells and chimes have caused the subscriber to be disconnected. There have, in addition, been instances in which echoes in the telephone trunk itself have resulted in sufficient enhancement of energy at the signaling frequency because of poor return loss to produce the same result. Such an unwanted release of a previously established telephone connection is commonly referred to as talk-off.

The principal object of the present invention is to eliminate talk-off in a so-called in-band telephone signaling system under all conditions of operation.

Another object is to eliminate talk-off in an in-band telephone signaling system and still preserve a substantially perfect transmission path for voice-frequency message waves.

In accordance with a feature of the invention, a narrow-band filter is connected at the transmitting terminal of an in-band telephone signaling system to reduce energy in the voice-frequency message wave at the signaling frequency sufficiently, relative to energy at other ferquencies in the voice-frequency band, to prevent false trunk-idle indications from being detected at the receiving terminal. The signaling tone is applied to the trunk, when appropriate, on the output side of the filter. As a result, the transmitted voice-frequency message wave never contains sufficient energy at the signaling frequency, whether from external sources on the telephone subscriber's premises or from echoes within the telephone plant itself, to generate false signaling indications. All possibilities of talk-off are eliminated, even without elaborate guard networks for detecting the presence of energy elsewhere in the voice-frequency band.

Another feature of the invention permits retention of a substantially perfect transmission path for voice-frequency message waves in an in-band telephone signaling system even when energy in such waves at the signaling frequency has been reduced by filtering at the transmitting terminal to prevent talk-off. In accordance with this feature of the invention, the energy at the signaling frequency effectively removed by filtering at the transmitting terminal is reinserted by complementary filtering at the receiving terminal. The reinsertion is achieved by the use of a tuned amplifier which increases the signaling frequency energy by the same amount, relative to the other frequencies in the voice-frequency band, that it was decreased at the transmitting terminal.

Figure 2A:
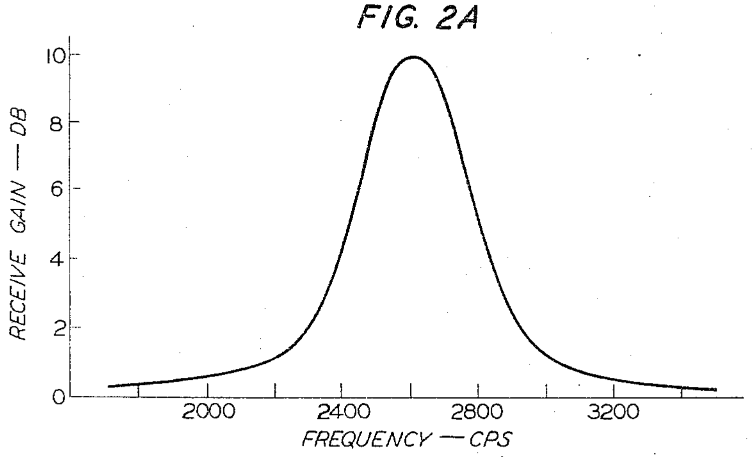
Figure 2B:
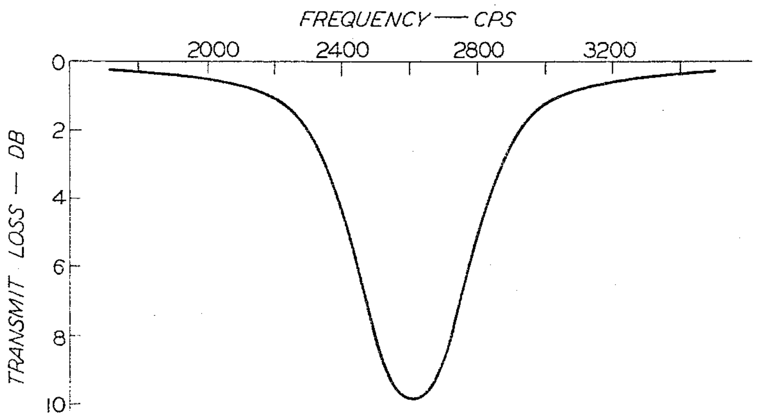
Figure 2C:
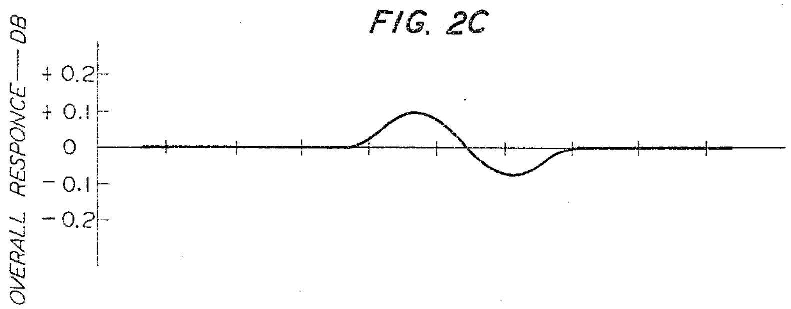

A more complete understanding of the invention may be obtained by a study of the following detailed description of a specific embodiment. In the drawings:

FIG. 1 illustrates both transmitting and receiving terminals of an in-band telephone signaling system embodying the invention; and FIGS. 2A, 2B, and 2C illustrate transmission characteristics afforded by the complementary filtering featured by the invention at transmitting and receiving terminals of an in-band signaling system.

FIG. 1 illustrates an in-band signaling unit which includes a transmitting section, a receiving section, and a four-wire terminating section. The latter is shown only by way of example, as the invention is of course also applicable to trunks in which all transmission is on a four-wire basis. As illustrated, the terminating section is made up of a three-winding transformer 11 and a terminating network 12. Two of the windings of transformer 11 are connected in series with respective sides of the two-wire line 13, with terminating network 12 connected between the end points. The third winding of transformer 11 is connected to the transmitting branch 14 of the four-wire trunk, while the center taps of the first two windings are connected in hybrid fashion to the receiving branch 15.

The transmitting section of the illustrated in-band signaling unit contains a relay 16 which connects a signaling frequency oscillator 17 to the transmitting branch of the four-wire line during trunk-idle conditions. The contacts of relay 16 are designated 16' and include a pair of break (closed when the relay is released) contacts, indicated by single horizontal lines. The signaling frequency normally used in telephone trunks is 2600 cycles per second, as illustrated, but other frequencies may be used as alternatives.

Signaling frequency oscillator 17 is connected to each side of transmitting line 14 by a respective one of a pair of current-limiting resistors 18 and 19, connected in series with a respective break contact of relay 16. The operating coil of relay 16 is connected between the so-called M lead at the nearby central office and ground. The M lead is an independent lead, designated M for largely historical reasons, that receives D.-C. signals from the central office trunk circuits to identify such trunk conditions as idle and busy. Typically, the M lead is grounded when the trunk is idle and returned to the central office battery when the trunk is busy. Thus, when the M lead is grounded, relay 16 is released and the transmitting section of the signaling unit sends a trunk-idle indication by transmitting a 2600-cycle tone out over the line. When the M lead is returned to battery, relay 16 is operated and the signaling unit sends a trunk-busy indication by discontinuing the 2600-cycle tone.

Absent the present invention, it is possible for 2600-cycle energy to be transmitted oven when signaling frequency oscillator 17 is not connected to the transmitting line. Strong components at that frequency in the voice-frequency message wave received from the nearby central office by way of two-wire trunk 13 may, for example, have the effect of simulating the presence of the signaling tone. To prevent the unwanted transmission of 2600-cycle energy during trunk-busy conditions, a narrow-band filter 20 is, in accordance with a feature of the invention, inserted in the transmitting line between the four-wire transmitting section and the point along the transmitting line 14 where oscillator 17 is connected. As shown in FIG. 1, filter 20 may, for example, take the form of a balanced bridged-T filter having a separate pair of resistors connected in series with each side of the line. Each pair of resistors is bridged by the parallel combination of a resistor, a capacitor, and an inductor. The junction points of the two pairs of series resistors are joined by a shunt arm comprising a resistor, a capacitor, an inductor, another capacitor, and another resistor connected in series with one another.

The transmission characteristic of filter 20 is shown in FIG. 2B. As illustrated, the filter is sharply tuned to the 2600-cycle signaling frequency and has a maximum attenuation of approximately 10 db. It thus has a minimum adverse effect on the transmitted voice-frequency message waves and leaves even the energy at and near the signaling frequency at levels where it can be easily restored upon reception. Because any energy at the signaling frequency in the transmitting voice-frequency message wave has been so sharply reduced, the problem of talk-off is thus solved. Regardless of the presence of birds, bells, or chimes near the subscriber's telephone instrument or of adverse return loss characteristics within the telephone plant, transmission of a false trunk-idle indication is impossible.

Since identical in-band signaling units are used at both ends of a telephone trunk, only one such unit is illustrated. The apparatus depicted in FIG. 1 is duplicated at the other end of the four-wire trunk. The receiving section of the illustrated signaling unit is described, therefore, just as if it were at the remote end of the four-wire trunk.

The receiving section of the illustrated in-band signaling unit is coupled to the incoming or receiving portion of the four-wire trunk by the primary winding of a transformer 41 which has a pair of secondary windings to provide separate message and signaling paths. In the message path, the resistance arm of a potentiometer 42 is connected across one of the secondary windings. One end of the resistance arm of the potentiometer 42 is grounded, and the movable contact is connected through a current-limiting resistor 43 to the base electrode of a p-n-p transistor 44. Transistor 44 has its collector electrode connected through the primary winding of an output transformer 45 to the negative terminal of a local D.-C. source 46. The positive terminal of D.-C. source 46 is grounded. Negative feedback is provided by a resistor 47 connected between the emitter electrode of transistor 44 and ground. Transistor 44 and its associated circuitry make up the voice-frequency amplifier of the receiving section of the illustrated in-band signaling unit. The message path is completed by the secondary winding of the amplifier output transformer 45, which is connected directly to receiving line 15 and the four-wire terminating section of the signaling unit.

The signaling path in the receiving section of the illustrated in-band signaling unit is coupled through the other secondary winding of transformer 41. A signaling receiver 48, which may take the form of the corresponding circuitry in the conventional in-band signaling unit illustrated in FIG. 11 of the paper "In-Band Single-Frequency Signaling," by A. Weaver and N. A. Newell, appearing at pages 1309 through 1330 of the November 1954 issue of the Bell System Technical Journal, is connected to that winding. Signaling receiver 48 indicates the presence of a 2600-cycle tone on the receiving line, rectifies it, and if it persists beyond a minimum time interval supplies it to the operating coil of a relay 49. A make contact (indicated by a cross) of relay 49 is designated 49' and is connected between ground and the so-called E lead at the nearby central office. When the signaling tone is received, relay 49 operates and causes the E lead to be grounded, signifying a trunk-idle condition. When the signaling tone is absent, relay 49 releases and causes ground to be removed from the E lead, signifying a trunk-busy condition to the switching circuits at the receiving central office.

As has already been pointed out, the sharply tuned filter provided in the transmitting portion of the signaling unit in accordance with the invention prevents energy in the message wave at the signaling frequency from being transmitted to the receiving unit in sufficient strength to create a talk-off problem. The voice-frequency message wave which is received from the four-wire line, amplified and passed on to two-wire line 13 has, however, been impaired. In accordance with another feature of the invention, this impairment is eliminated and a substantially smooth transmission characteristic for voice-frequency message waves is achieved.

In accordance with this second feature of the invention, the voice-frequency amplifier in the receiving section of the in-band signaling unit is given a transmission characteristic substantially complementary to that of the filter in the transmitting section. In the illustrated embodiment of the invention, such a characteristic is achieved by connecting a receiving filter 50 into the negative feedback path of the amplifier. As shown in FIG. 1, this filter takes the form of a series inductor and capacitor connected in parallel with emitter resistor 47. The resulting response characteristic of the amplifier is illustrated in FIG. 2A, in which the base line is the response of the receiving amplifier without the added reactive elements. As shown in FIG. 2A, the response of the amplifier is peaked at 2600 cycles, the frequency of the signaling tone, by an amount substantially equal to the reduction in response at that frequency at the transmitting unit.

The net response characteristic for voice-frequency message waves received at two-wire trunk 13 in an embodiment of the invention incorporating both signaling frequency energy suppression and restoration approximates that shown in FIG. 2C. Although talk-off has been eliminated as a problem by suppressing signaling frequency energy in voice-frequency message waves at the transmitting terminal by approximately 10 db, the maximum disturbance to the net response characteristic of the system is only of the order of 0.1 db.

It is to be understood that the above-described arrangement is illustrative of the application of the principles of the invention. Numerous other arrangements may be devised by those skilled in the art without departing from the spirit and scope of the invention.

What is claimed is:

1. In a telephone system for sending complex voice-frequency message waves occupying a predetermined frequency band over a telephone trunk from a transmitting terminal to a receiving terminal, means at said transmitting terminal to transmit a substantially single-frequency tone within said frequency band over said trunk to said receiving terminal to signal that the trunk is idle, means at said receiving terminal to detect said tone, a filter at said transmitting terminal to reduce relative to energy at other frequencies in said frequency band any energy in said message waves at the frequency of said tone, and a complementary tuned amplifier at said receiving terminal to increase by a corresponding amount relative to the energy at other frequencies in said frequency band any energy in the received message waves at the frequency of said tone, whereby any energy in said message waves at the frequency of said tone is prevented from generating a false trunk-idle indication at said receiving terminal and disturbance of the substantially smooth transmission characteristic of the trunk is avoided.

2. In a telephone system for sending complex voice-frequency message waves occupying a predetermined frequency band over a telephone trunk from a transmitting terminal to a receiving terminal, means at said transmitting terminal to transmit a substantially single-frequency tone within said frequency band over said trunk to said receiving terminal to signal that the trunk is idle, means at said receiving terminal to detect said tone, a filter at said transmitting terminal to reduce relative to energy at other frequencies in said frequency band any energy in said message waves at the frequency of said tone, and an amplifier at said receiving terminal having a negative feedback path containing a reactance network tuned to the frequency of said tone to peak said amplifier's response characteristic and increase by a corresponding amount relative to the energy at other frequencies in said said frequency band any energy in the received message waves at the frequency of said tone, whereby any energy in said message waves at the frequency of said tone is prevented from generating a false trunk-idle indication at said receiving terminal and disturbance of the substantially smooth transmission characteristic of the trunk is avoided.

3. In a telephone system for sending both complex voice-frequency message waves occupying a predetermined frequency band and two-state trunk-idle or trunk-busy information over a telephone trunk from a transmitting terminal to a receiving terminal, switching means at said transmitting terminal to apply a substantially single-frequency tone within said frequency band to said trunk when said trunk is idle and no tone when said trunk is busy, means at said receiving terminal to detect and register the presence or absence of said tone, a filter at said transmitting terminal to reduce relative to energy at other frequencies in said band any energy in said message waves at the frequency of said tone prior to application to said trunk, and a tuned amplifier complementary to said filter at said receiving terminal to increase by a corresponding amount relative to the energy of other frequencies in said frequency band any energy in the received message waves at the frequency of said tone, whereby any energy in said message waves at the frequency of said tone is prevented from generating a false trunk-idle indication at said receiving terminal and disturbance of the substantially smooth transmission characteristics of the trunk is avoided.

4. In a telephone system for sending both complex voice-frequency message waves occupying a predetermined frequency band and two-state trunk-idle or trunk-busy information over a telephone trunk from a transmitting terminal to a receiving terminal, switching means at said transmitting terminal to apply a substantially single-frequency tone within said frequency band to said trunk when said trunk is idle and no tone when said trunk is busy, means at said receiving terminal to detect and register the presence or absence of said tone, a filter at said transmitting terminal to reduce relative to energy at other frequencies in said band any energy in said message waves at the frequency of said tone prior to application to said trunk, and an amplifier at said receiving terminal having a negative feedback path containing a reactance network tuned to the frequency of said tone to peak said amplifier's response characteristic and increase by a corresponding amount relative to the energy at other frequencies in said frequency band any energy in the received message waves at the frequency of said tone, whereby any energy in said message waves at the frequency of said tone is prevented from generating a false trunk-idle indication at said receiving terminal and disturbance of the substantially smooth transmission characteristics of the trunk is avoided.

References Cited by the Examiner

UNITED STATES PATENTS

| | | | |
|---|---|---|---|
| 2,549,803 | 4/1951 | Gohorel | 179—16.09 |
| 3,103,558 | 9/1963 | Ligotky | 179—84 |
| 3,114,005 | 12/1963 | Kuhn | 179—84 |
| 3,131,352 | 4/1964 | Ensink | 179—84 |

KATHLEEN H. CLAFFY, *Primary Examiner.*

H. ZELLER, *Examiner.*